United States Patent [19]

Minoura et al.

[11] Patent Number: 4,990,771

[45] Date of Patent: Feb. 5, 1991

[54] SCANNING OPTICAL APPARATUS HAVING FOCUS POSITION DETECTOR

[75] Inventors: Kazuo Minoura, Yokohama; Isamu Shimoda, Zama, both of Japan

[73] Assignee: Canon Kabushiki Kaisha, Tokyo, Japan

[21] Appl. No.: 522,070

[22] Filed: May 11, 1990

Related U.S. Application Data

[63] Continuation of Ser. No. 353,786, May 18, 1989, abandoned.

[30] Foreign Application Priority Data

May 19, 1988 [JP] Japan .................................. 63-123624

[51] Int. Cl.$^5$ .......................... G02B 26/08; H01J 3/14
[52] U.S. Cl. ................................... 250/236; 346/108; 350/6.8; 250/201.2
[58] Field of Search ............... 250/236, 235, 234, 201, 250/201.2, 201.4; 346/108; 350/6.8, 6.7, 6.6, 6.5; 358/481, 480

[56] References Cited

U.S. PATENT DOCUMENTS

| | | | |
|---|---|---|---|
| 4,214,157 | 7/1980 | Check, Jr. et al. | 250/236 |
| 4,274,101 | 6/1981 | Kataoka et al. | 346/108 |
| 4,314,154 | 2/1982 | Minoura et al. | 350/6.7 |
| 4,323,297 | 4/1982 | Kawamura et al. | 350/6.8 |
| 4,563,056 | 1/1986 | Tagawa et al. | 350/6.8 |
| 4,661,861 | 4/1987 | Rutherford et al. | 346/108 |
| 4,720,632 | 1/1988 | Kancko | 250/236 |
| 4,733,064 | 3/1988 | Ishikawa | 250/236 |
| 4,829,175 | 5/1989 | Goto et al. | 250/236 |

*Primary Examiner*—David C. Nelms
*Assistant Examiner*—Michael Messinger
*Attorney, Agent, or Firm*—Fitzpatrick, Cella, Harper & Scinto

[57] ABSTRACT

A scanning optical apparatus comprises a light source unit, an optical system for converging a light beam from the light source unit at a predetermined position, a moving device for moving the converged position of the light beam by the optical system, a deflecting device for deflecting the light beam from the light source unit in a predetermined direction, a light receiving device for receiving the light beam deflected by the deflecting device, a processing device for processing a signal obtained by said light receiving device, and a control device for controlling the moving device corresponding to a signal from the processing device. The light beam emitted from the light source unit is scanned on the light receiving device a plurality of times through the optical system and the deflecting device, while the converged position of the light beam is moved by the moving device. The signal from the light receiving device during each of the plurality of scans is compared or calculated by the processing device to thereby adjust and determine the converged position of the light beam by the optical system.

26 Claims, 11 Drawing Sheets

FIG. 6A CONCEPT DIAGRAM

SCANNING OPTICAL APPARATUS HAVING FOCUS POSITION DETECTOR

This application is a continuation of application Ser. No. 07/353,786 filed May 18, 1989, now abandoned.

BACKGROUND OF THE INVENTION

1. Field of the Invention

This invention relates to a scanning optical apparatus for scanning a light beam from a light source on a scan surface through a deflector and a lens system, and in particular to a scanning optical apparatus provided with a mechanism for detecting and correcting the focus position deviation of the imaged spot of a light beam on the scan surface which is attributable to the fluctuation of the environmental conditions such as temperature, etc.

2. Related Background Art

In recent years, as scanning optical apparatuses, use has widely been made of laser beam printers in which a laser source is modulated in conformity with an image signal and a laser light from said modulated laser source is periodically deflected by a deflector and is converged into a spot on a scanning surface, e.g. a photosensitive recording medium, by a lens system, and is exposure-scanned to thereby accomplish image recording.

Now, the conventional laser beam printers have suffered from the disadvantage that each member constituting the lens system is thermally deformed by a change in the environmental temperature and the converged position of the laser beam on the photosensitive member (the scan surface) deviates to deteriorate the quality of image.

As a means for overcoming such disadvantage, there is disclosed in Japanese Laid-Open Pat. application No. 60-100113 a laser beam printer provided with focus deviation detecting means for receiving a part of a beam scanned on a photosensitive member and detecting focus deviation, and a lens moving device having a correction lens for correcting said focus deviation.

However, in the aforementioned Japanese Laid-Open Patent application No. 60-100113, an astigmatism system is employed as the focus deviation detecting system. This system is effective for a stationary light beam, but is unsuitable for the detection of the focus deviation of a light beam scanned at a high speed.

Also, in Japanese Laid-Open Patent application No. 62-81873, there is shown a system in which a plurality of light receiving elements arranged in a direction perpendicular to the direction of scanning of a light beam are used as focus deviation detecting means and the number of the light receiving elements which have received the light beam is used as information for focus adjustment.

However, in the system shown in this Japanese Laid-Open patent application, the size of the diameter of the imaged spot in the sub-scanning direction, which is a direction, perpendicular to the scanning direction, can be detected, but the size of the diameter of the imaged spot in the main scanning direction, which is, in the scanning direction cannot be detected. In, a laser beam printer, the size of the diameter of the imaged spot in the main scanning direction is usually smaller than the size of the diameter of the imaged spot in the sub-scanning direction and therefore, the imaged spot in the main scanning direction is more liable to be affected by the fluctuation of the environmental conditions and greatly changed than the imaged spot in the sub-scanning direction. Consequently, the above-described system cannot provide a scanning optical apparatus which prevents the deviation of the imaged spot attributable to the fluctuation of the environmental temperature and is capable of accurately scanning a laser beam. Further, in the system shown in the above-mentioned publication, it is necessary that a predetermined number of bits of information be memorized in advance in the apparatus, and if the memory of the predetermined number of bits of information is lost due to some trouble or other, detection of the focus position deviation becomes impossible.

SUMMARY OF THE INVENTION

It is the object of the present invention to eliminate the above-noted disadvantages peculiar to the prior-art apparatuses and to provide a method of readily detecting and correcting any focus position deviation by a simple construction.

The above object of the present invention is achieved by a scanning optical apparatus provided with a detecting mechanism for scanning a light beam from a light source on a scan surface through a deflector and a lens system and detecting the converged state of the light beam on said scan surface and a focus position moving mechanism for moving the converged position of the light beam on said scan surface and wherein a detector for receiving the light beam deflected by the deflector is used as the detecting mechanism for detecting the converged state of the light beam on said scan surface, and the light beam from said light source is scanned on said detector a plurality of times through the deflector and the lens system while the converged position of the light beam is moved by the focus position moving mechanism for moving the converged position of the light beam on said scan surface, and a signal from said detector during each of said plurality of times of scanning is compared or calculation-processed to thereby adjust and determine the converged position of the light beam on said scan surface.

DESCRIPTION OF THE PREFERRED EMBODIMENTS

Figure 1:
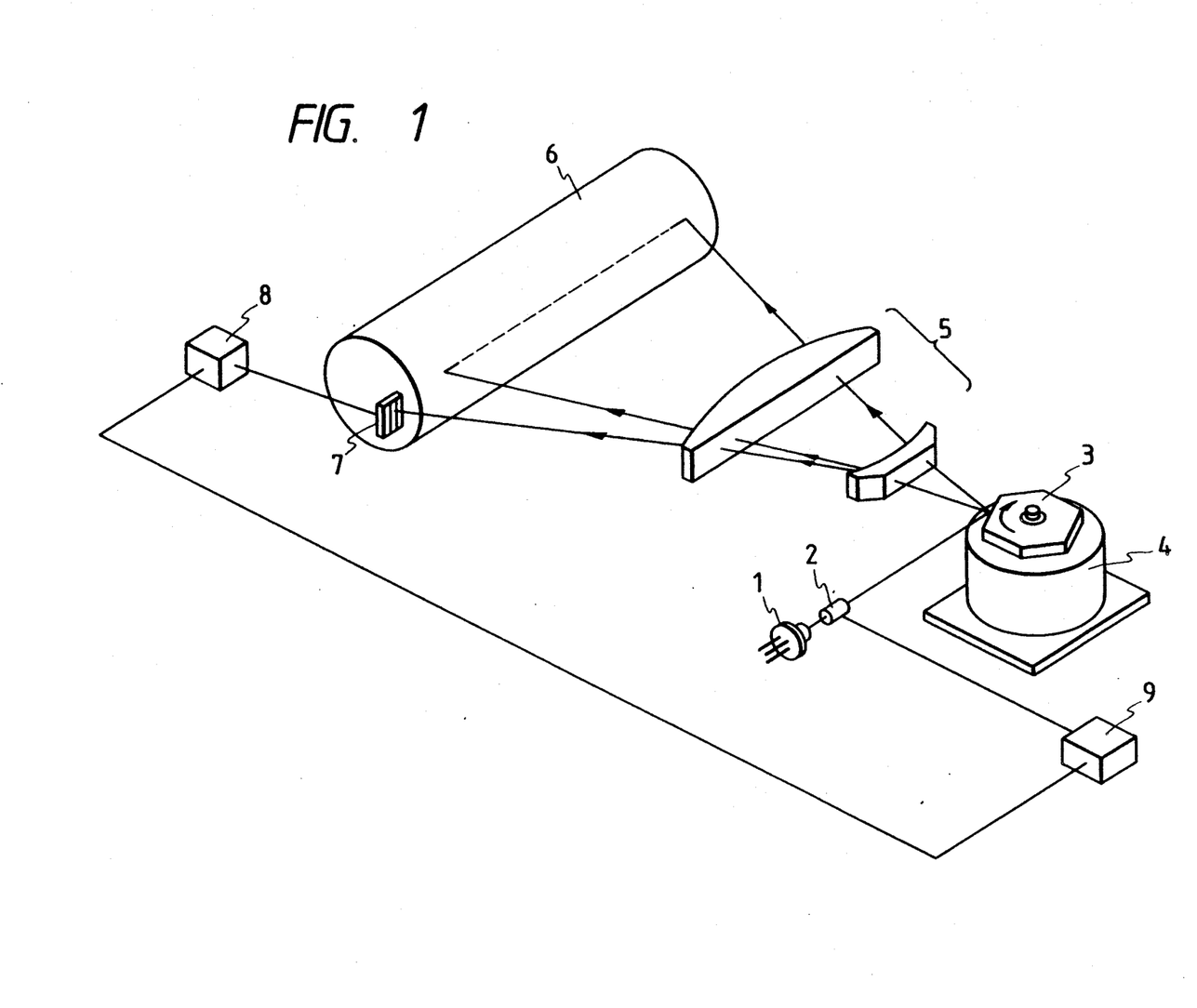
FIG. 1 is a perspective view of the scanning optical apparatus of the present invention.

Referring to FIG. 1 which illustrates a first embodiment of the scanning optical apparatus of the present invention, the reference numeral 1 designates a light source device comprising a semiconductor laser and a collimator lens, the reference numeral 2 denotes a lens system for movement of the focus position, the reference numeral 3 designates a rotational polygonal mirror which is a deflector, the reference numeral 4 denotes a drive motor for the rotational polygonal mirror, the reference numeral 5 designates a scanning lens system, the reference numeral 6 denotes a photosensitive recording drum, the reference numeral 7 designates a spot detector, the reference numeral 8 denotes a detection signal processing part for processing the electrical signal from the spot detector 7, and the reference numeral 9 designates a controlling part for generating a driving signal to the lens system 2 for movement of the focus position in conformity with a signal output from the detection signal processing part 8.

Figure 2:
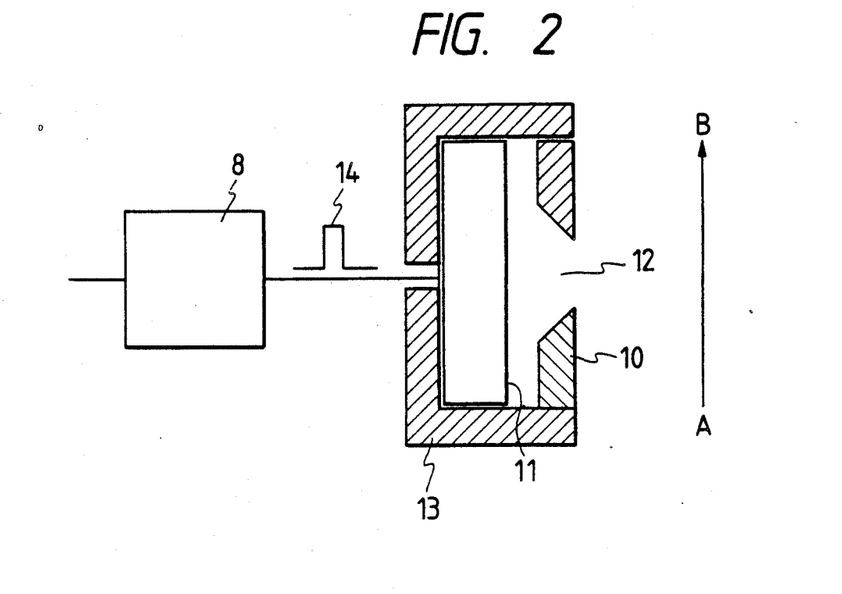
FIG. 2 schematically shows the structure of a photodetector.

FIG. 2 shows a cross-sectional view in a horizontal plane of the spot detector 7 having an opening limited in the scanning direction and the detection signal processing part 8 in FIG. 1. The reference numeral 10 designates an opening plate having a predetermined opening 12, the reference numeral 11 denotes a photoelectric converting surface, and the reference numeral 13 designates a support member.

Figure 3:
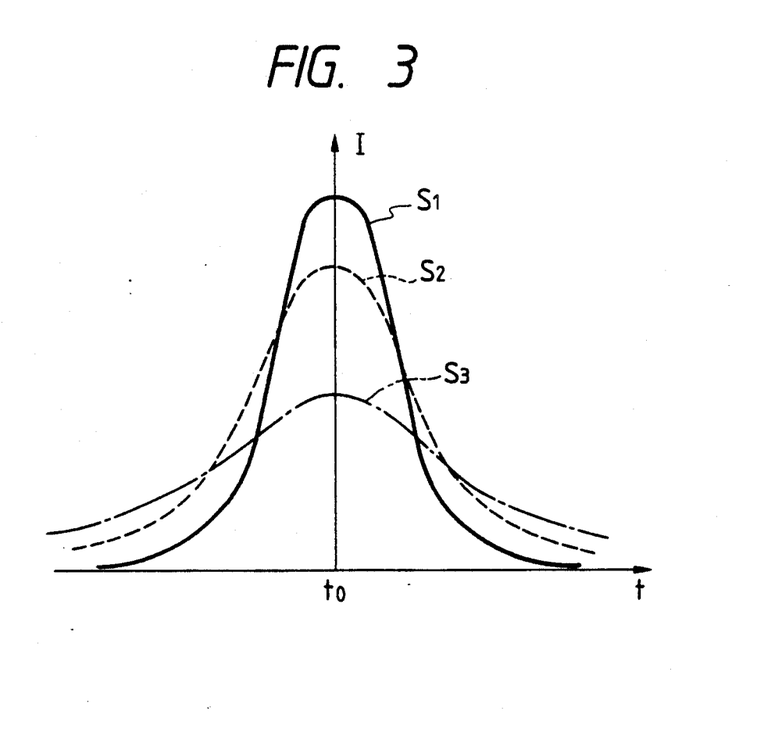
FIG. 3 shows signals corresponding to spots in various states which are output from the photodetector.

When a laser spot is scanned in the direction from A to B in FIG. 2 without the laser source being modulated, that is, with the laser source emitting light, the electrical signal 14 output from the spot detector 7 is generally represented as shown in FIG. 3. If the opening plate 10 is disposed on the extension of a laser beam scanning line (broken line) on the photosensitive member surface 6 of FIG. 6, i.e., at a position optically equivalent to the photosensitive member surface with respect to the light source, and scanning is effected with the position of the laser beam waist changed by moving the lens system 2 for movement of the focus position, the output signal I has its output pattern changed as indicated by $S_1$, $S_2$ and $S_3$ relative to time t. That is, as a result of the spot detector having been scanned with the position of the beam waist changed during each scan, there appears an output pattern in which the central intensity becomes greatest or an output pattern in which the half value width becomes smallest. The lens system 2 for movement of the focus position is operated by the controlling part 9 so as to assume the position of the beam waist (the converged position of the light beam) corresponding to that pattern. The control of detecting and correcting such focus position deviation may be effected before recording of information of a certain definite unit is effected, or may be executed with the laser oscillated near only the spot detector during the blanking period (the period during which formation of an image is not effected for a long time) of the time during which recording and scanning is effected (the time during which the light source is modulated and formation of an image is effected on the photosensitive member surface). Of course, said controlling operation is stopped when recording and scanning is being effected. Alternatively, said controlling operation may be executed during the blanking period (the period from after image recording on a certain recording sheet is completed until image recording on the next recording sheet is started) of the time during which image recording is effected on a predetermined plurality of recording sheets, for example, of size A4, A3 or the like. Of course, said controlling operation is stopped when image recording is being effected on the recording sheets. Also, a timer may be connected to the controlling part 9 of the apparatus, the controlling part may be operated for each predetermined time, the laser beam may be scanned a plurality of times and adjustment of the focus position may be effected. Also, a sensor for detecting any change in the environmental conditions such as temperature and humidity may be provided in the apparatus, and when a great change in the environmental conditions is detected by this sensor, said focus position adjustment operation may be performed.

The signal processing system of the first embodiment will now be described.

In the present invention, it is to be understood that curvature of image field is sufficiently corrected by the scanning lens system 5. Therefore, adjustment of the focus position ca be effected only at a point on the scanning line.

Peak Value Detection Focus Adjustment

A system for effecting focus position adjustment on the basis of the peak value of the quantity of light passed through an opening (slit) will hereinafter be described with reference to FIG. 4.

The quantity of light passed through the spot detector 7 in FIG. 1 has its peak value varied by the position in the direction of the optical axis. The peak value becomes maximum at the focus position and therefore, it can be found out. The spot detector 7 is comprised of photoelectric conversion 101 and a predetermined opening.

Figure 4A:
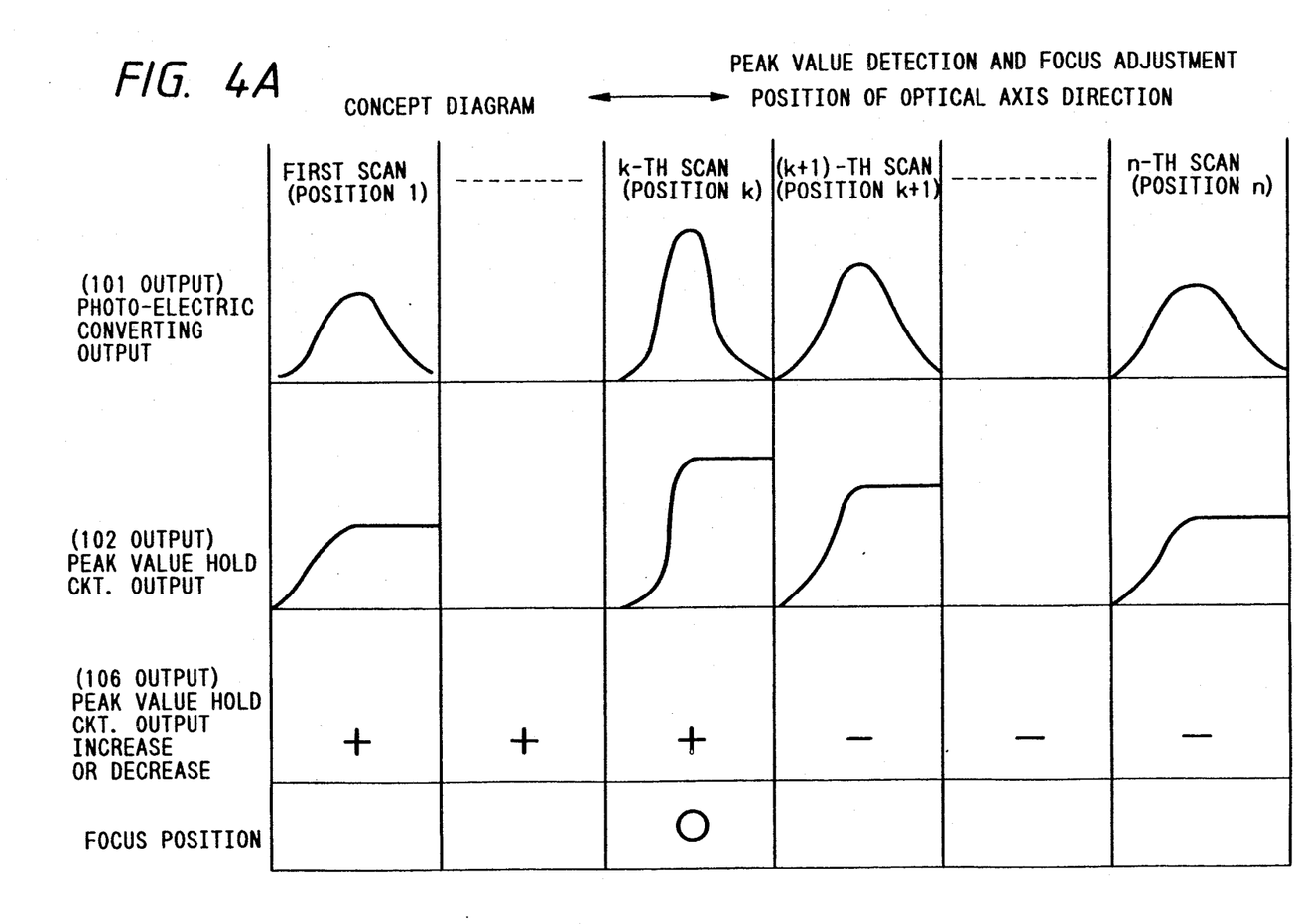
FIGS. 4A and 4B are a concept diagram of a focus position detecting method and a block diagram of the control thereof, respectively.
Figure 4B:
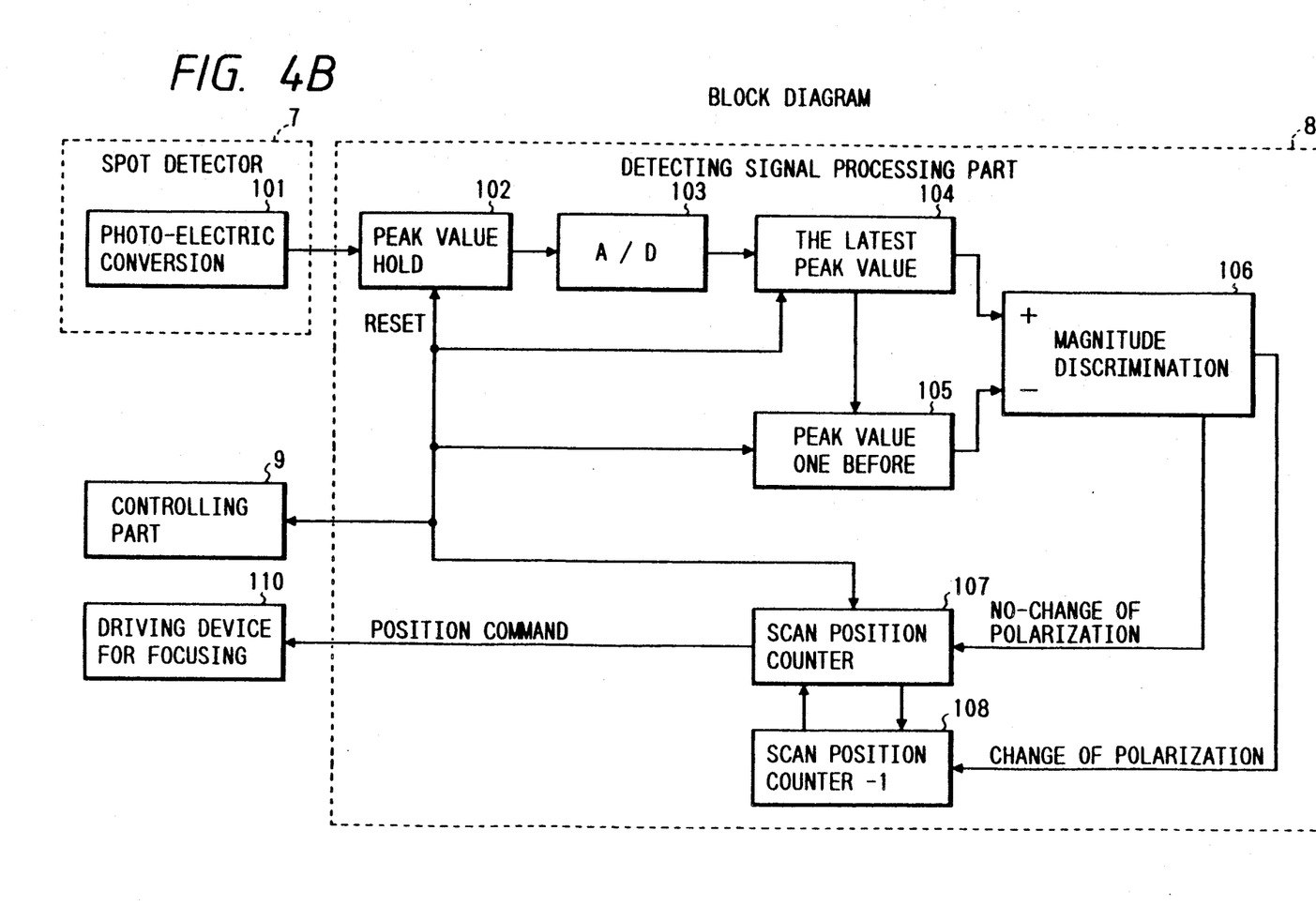

FIG. 4A is a concept diagram of it, and FIG. 4B is a block diagram.

Figure 5:
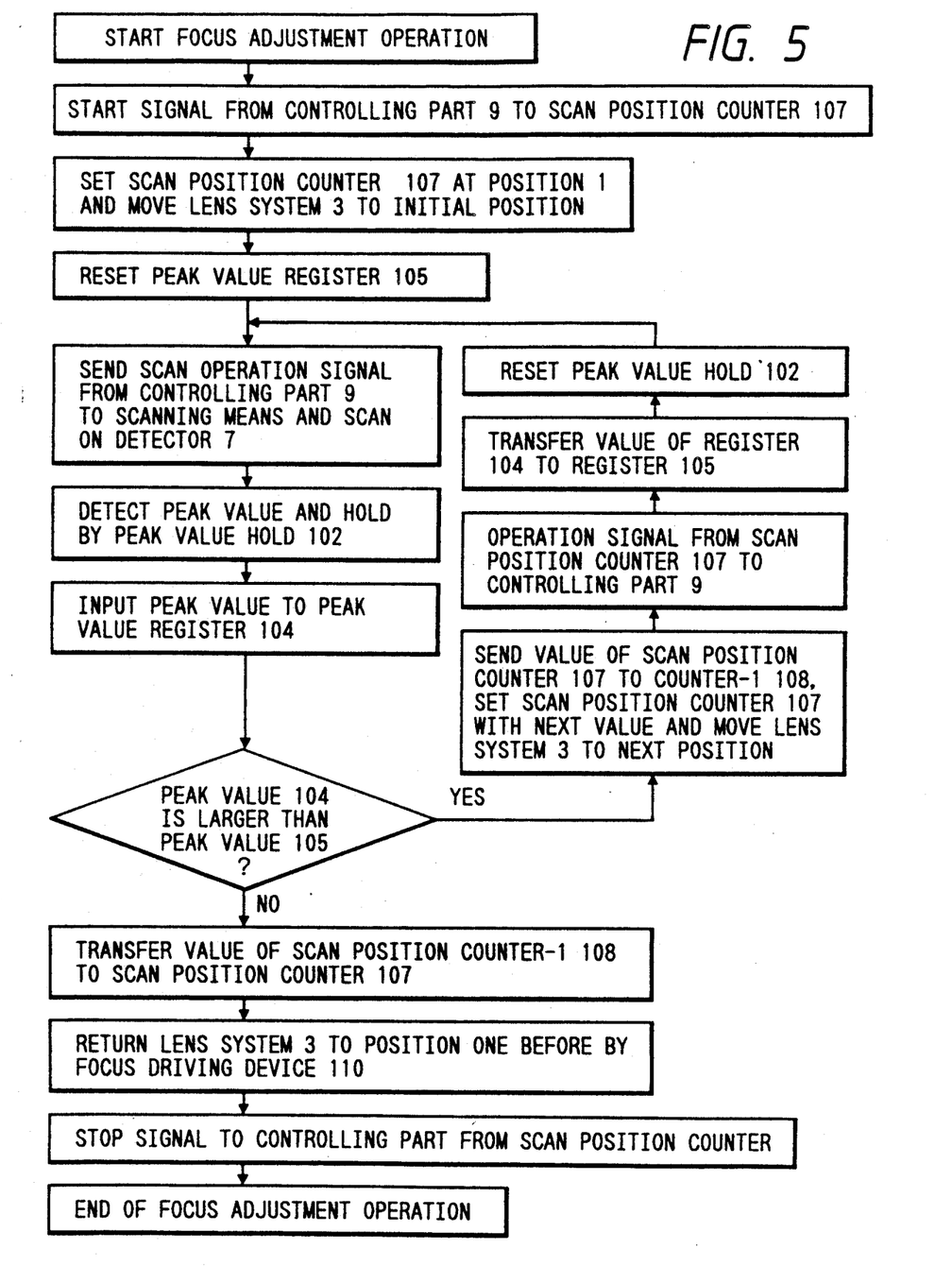
FIG. 5 is a flow chart of the method of FIG. 4.

The signal processing system for focus position adjustment operates with the detection signal processing part 8 as the center. FIG. 5 is a flow chart.

Prior to recording an information signal, adjustment of the focus position is effected. The signal of the controlling part 9 is sent to a scan position counter 107, the scan position counter is set to a position 1, and by the position command of the scan position counter 107, a driving device 110 for focusing moves the lens system 2 to the initial position 1 in the direction of the optical axis. As shown in FIG. 1, scanning of the scan beam is effected by scan means in a direction orthogonal to the optical axis. The position information of the position in the direction of the optical axis which is always smaller by 1 is input from the scan position counter 107 to a scan position counter-1 108. Thereafter, at each scan, the scan position counter 107 is stepwisely advanced by the output of the controlling part 9.

The output of the scan position counter 107 acts as a position command on the driving device 110 for focusing. B this command, the driving device 110 for focusing moves the position of the scan beam in the direction of the optical axis to a position 2, ..., a position k, ..., a position n, and effects scanning. Here, it is to be understood that the focus position is between these moved positions. If the focus position is not between these moved positions, the initial position can be moved.

The output of the photoelectric conversion 101 is shown in FIG. 4A. As shown, the output of the photoelectric conversion 101 is an electrical output proportional to the quantity of light passed through the silt, and the peak value thereof varies correspondingly to a change in the position in the direction of the optical axis.

The output of the photoelectric conversion 101 has its peak value held by a peak value hold 102. This state is shown by the peak value hold circuit output of FIG. 4A. At each scan (i.e., each position in the direction of the optical axis), the peak value obtained by the last scan is reset by the output of the controlling part.

The held peak value is converted from an analog voltage into a digital amount by an A/D converter 103. This digital amount is held by a register 104 for the latest peak value. By the starting of the next scan, the value held by the register 104 for the latest peak value is transferred to a register 105 for the peak value one before. The register 105 for the peak value one before is cleared prior to measurement.

The output of the register 104 for the latest peak value and the output of the register 105 for the peak value one before are discriminated by a magnitude discrimination circuit 106 as to whether the magnitudes thereof, i.e., the peak values thereof, are increased or decreased. If the polarity of the output of the magnitude discrimination circuit 106 has changed, it is seen that it has passed the position in the direction of the optical axis at which the peak value becomes maximum. The position information one before the current position is input to the scan position counter-1 108 and therefore, if the polarity of the output of the magnitude discrimination circuit 106 has changed, that position in the direction of the optical axis is memorized. This position is the focus position. The position information of the scan position counter-1 108 is transferred to the scan position counter-1 108. Lens system 2 is returned to the position one before by the driving device 110 for focusing, and a stop command is put out from the scan position counter 107 to the controlling part 9, whereby adjustment of the focus position is completed. For that purpose, the position of the scan beam in the direction of the optical axis is fixed at the focus position by the driving device 110 for focusing. The focus position of the scan beam is always fixed on the photosensitive recording drum 6 which is at the same position in the direction of the optical axis as the spot detector 7.

Variance $\sigma$ Detection Focus Adjustment

Figure 6A:
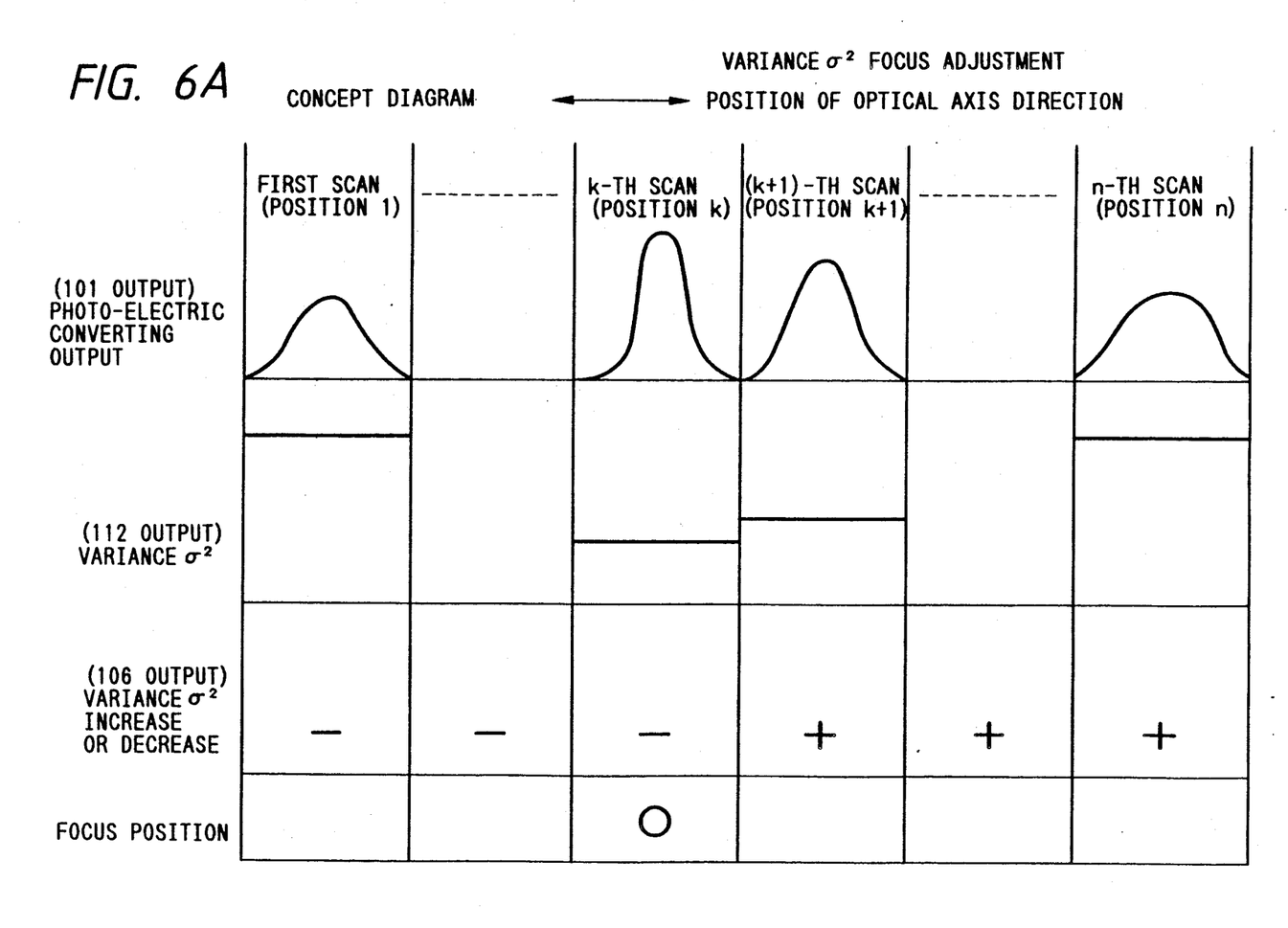
FIGS. 6A and 6B are a concept diagram of another focus position detecting method and a block diagram of the control thereof, respectively.
Figure 6B:
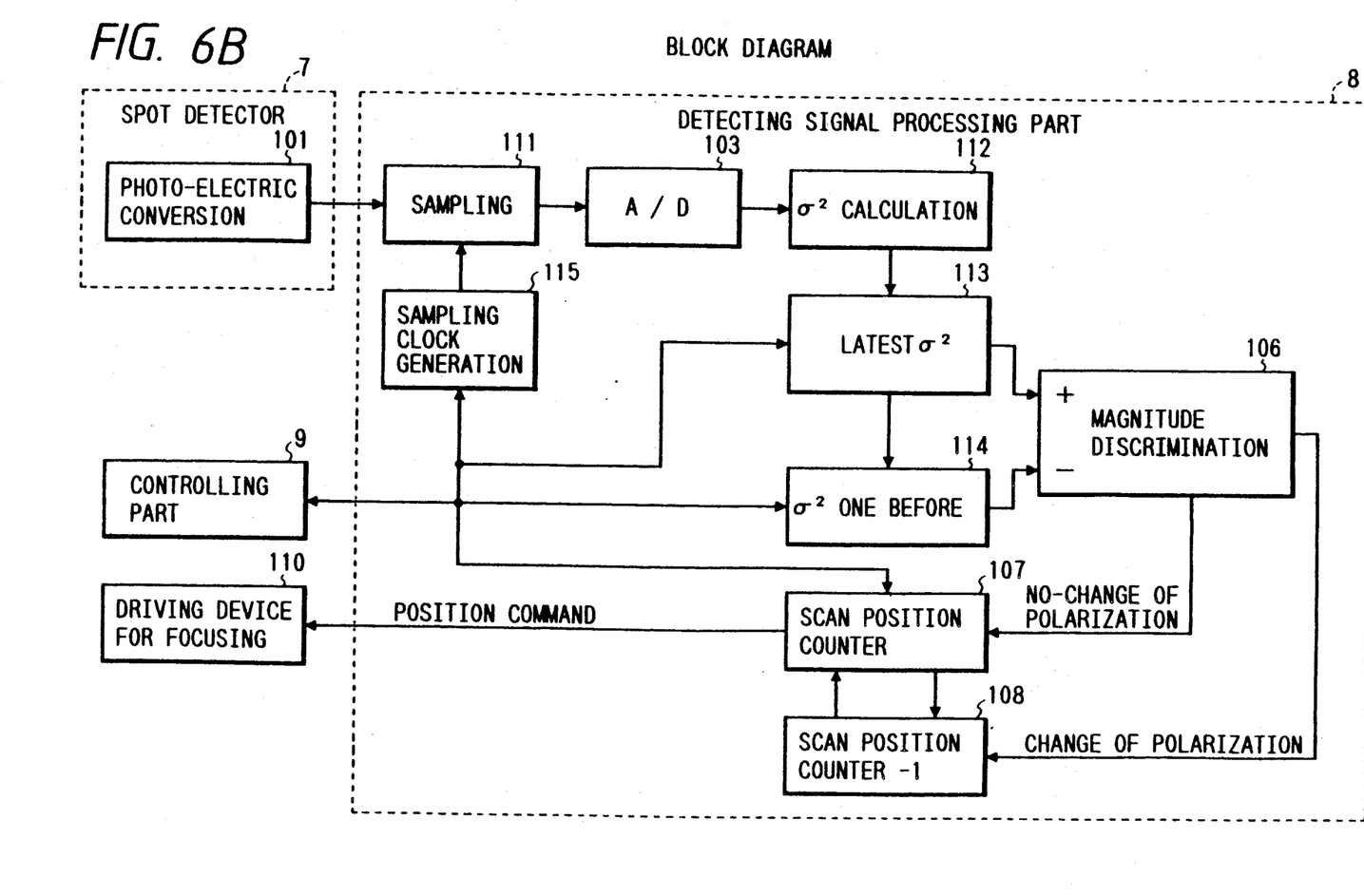

A system for effecting focus position adjustment by the variance $\sigma$ value of the distribution of the quantity of light passed through the opening (slit) will hereinafter be described with reference to FIG. 6.

Figure 7:
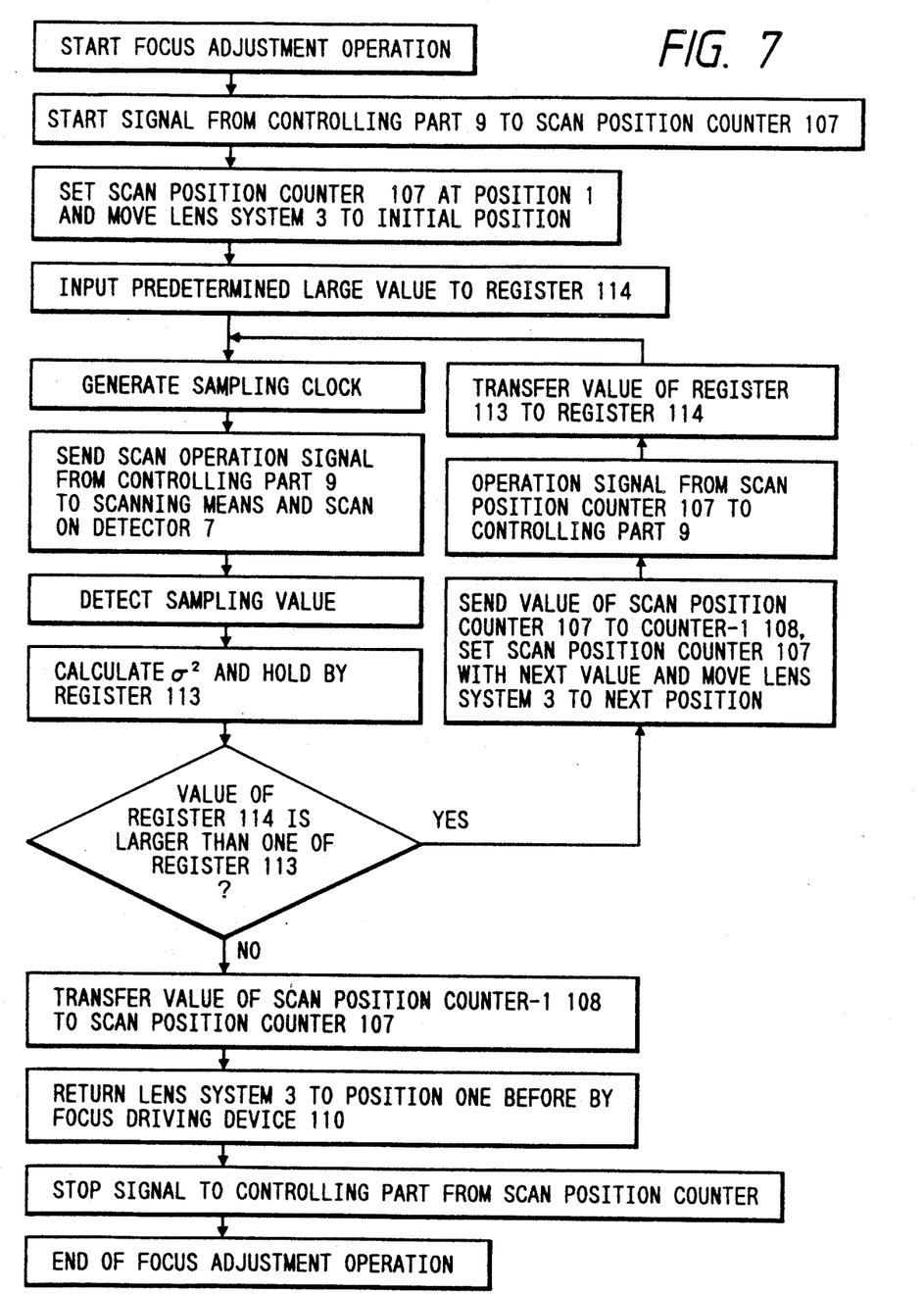
FIG. 7 is a flow chart of the method of FIG. 6.

The distribution of the quantity of light passed through the spot detector 7 in FIG. 1 has its variance $\sigma$ value varied by the position in the direction of the optical axis. The variance $\sigma$ value becomes minimum at the focus position and therefore, it can be found out. FIG. 6A is a concept diagram of it, and FIG. 6B is a block diagram. FIG. 7 is a flow chart.

Prior to recording an information signal, adjustment of the focus position is effected. The signal of the controlling part 9 is sent to the scan position counter 107, and the scan position counter is set to a position 1. The operations of the scan position counter 107, the driving device 110 for focusing, the scan position counter-1 108 and the photoelectric conversion 101 are similar to those previously described and therefore need not be described.

The output of the photoelectric conversion 101 is an electrical output proportional to the quantity of light passed through the slit, and the variance $\sigma$ value thereof varies correspondingly to a change in the position in the direction of the optical axis.

The output of photoelectric conversion 101 is sampled in a sampling circuit 111 by the sampling clock of a sampling clock generation circuit 115 and the sample value thereof is held. The sampling clock may desirably be thirty or more times the scan repetition frequency. The held sample value is converted from an analog voltage into a digital amount by an A/D converter 103.

This digital amount has its variance $\sigma$ value calculated by $\sigma$ calculation means 112 during each scan. The $\sigma$ calculation means 112 may preferably be a combination of a microprocessor, ROM and RAM. The output of the $\sigma$ calculation means 112 is memorized by a register 113 for the latest $\sigma$.

By the starting of the next scan, the value held by the register 113 for the latest $\sigma$ is transferred to a register 114 for $\sigma$ one before. A value much greater than the variance value $\sigma$ coming out during the measuring operation is input to the register 114 for $\sigma$ one before, prior to measurement.

The output of the register 113 for the latest $\sigma$ and the output of the register 114 for $\sigma$ one before are discriminated by the magnitude discrimination circuit 106 as to whether their magnitudes, i.e., the variance $\sigma$ values, are increased or decreased. If the polarity of the output of the magnitude discrimination circuit 106 has changed, it is seen that it has passed the position in the direction of the optical axis at which the variance $\sigma$ value becomes minimum. The position information one before the current position is input to the scan position counter-1 108 and therefore, if the polarity of the output of the magnitude discrimination circuit 106 has changed, that position in the direction of the optical axis is memorized. This position is the focus position. The operation thereafter is similar to that of the previously described example.

Time Measuring Focus Adjustment

Figure 8A:
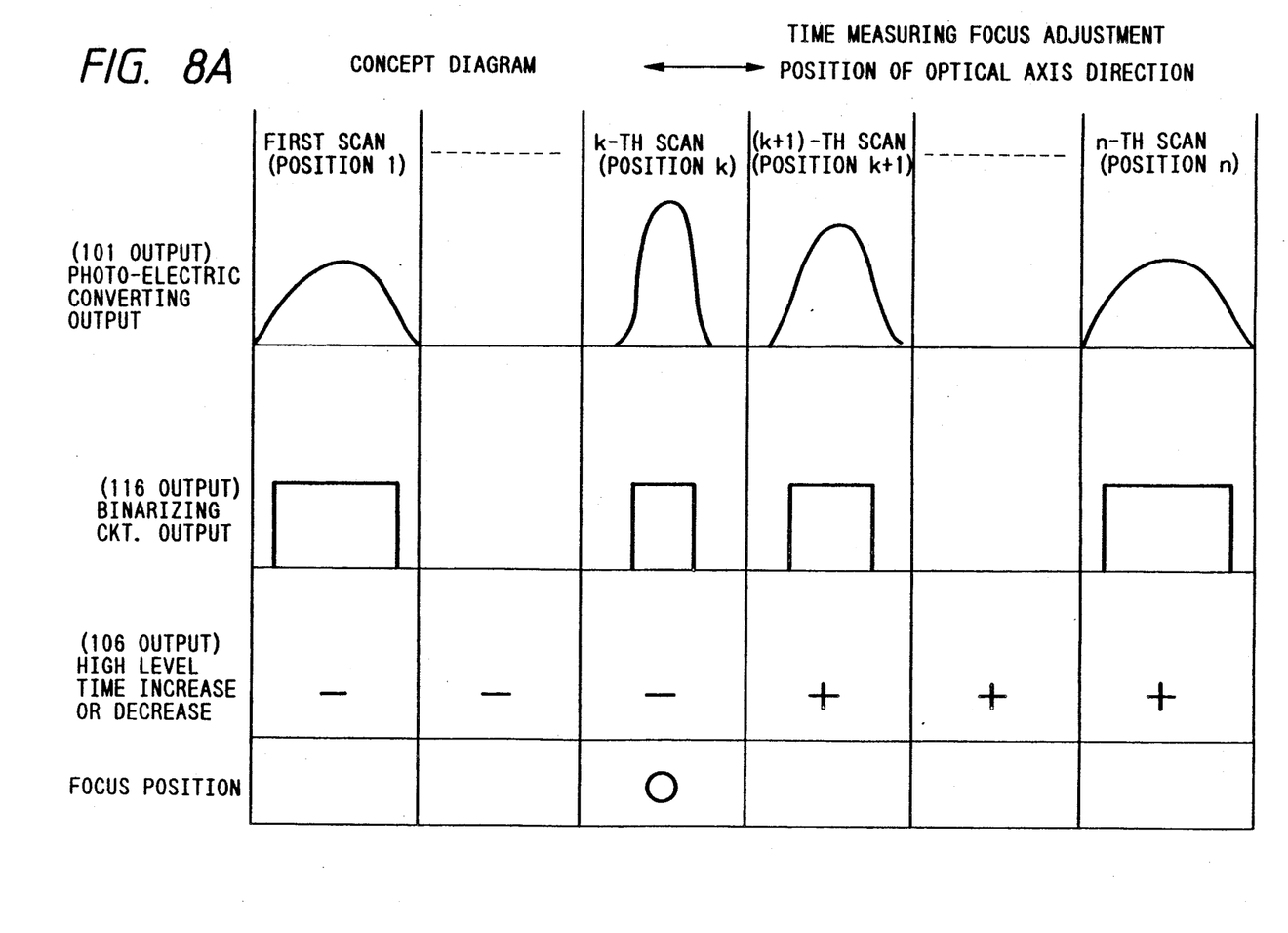
FIGS. 8A and 8B are a concept diagram of still another focus position detecting method and a block diagram of the control thereof, respectively.
Figure 8B:
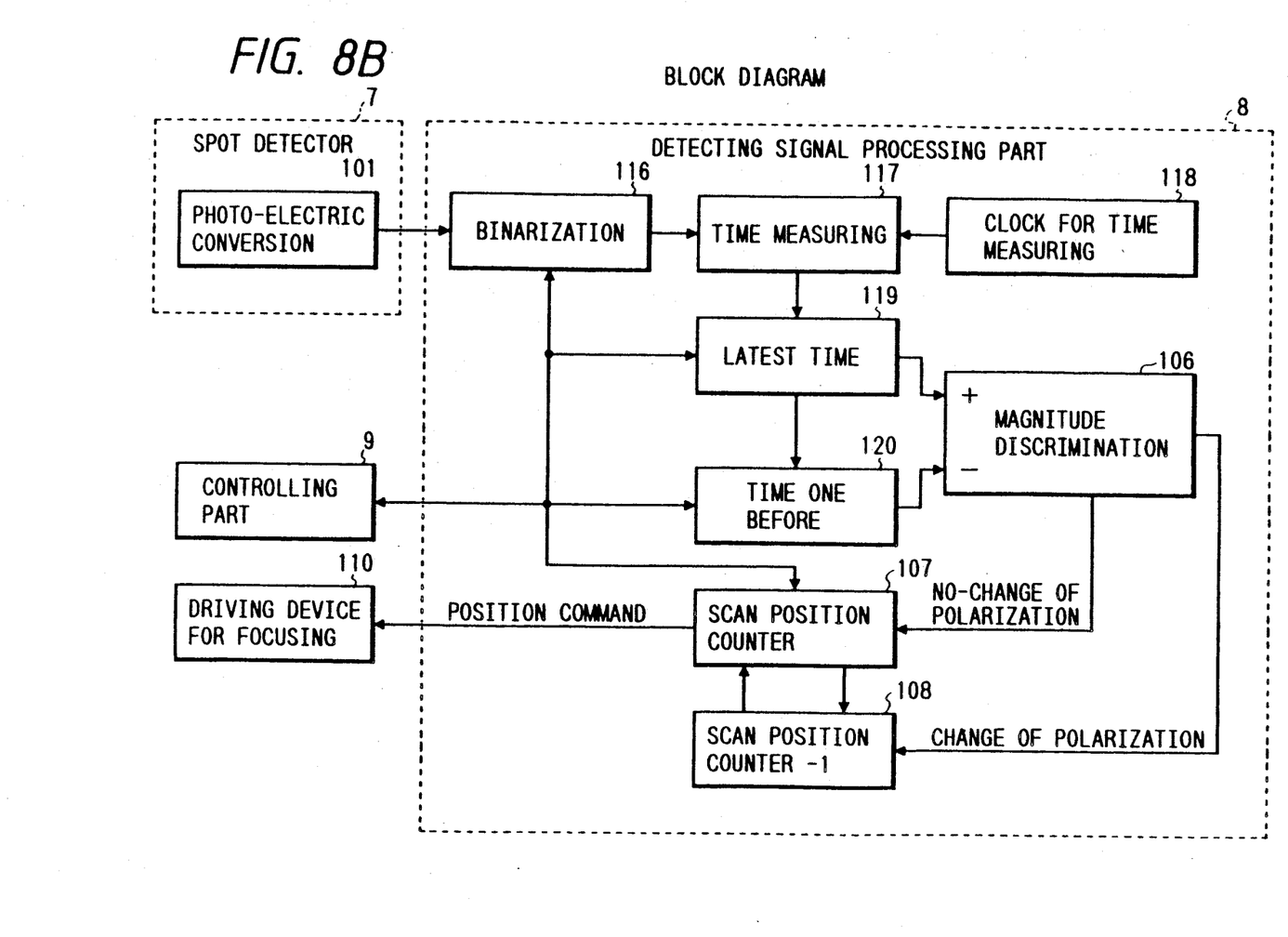

A system for effecting focus position adjustment by measuring the time for which the quantity of light passed through the slit is at a predetermined level or higher will hereinafter be described with reference to FIG. 8.

Figure 9:
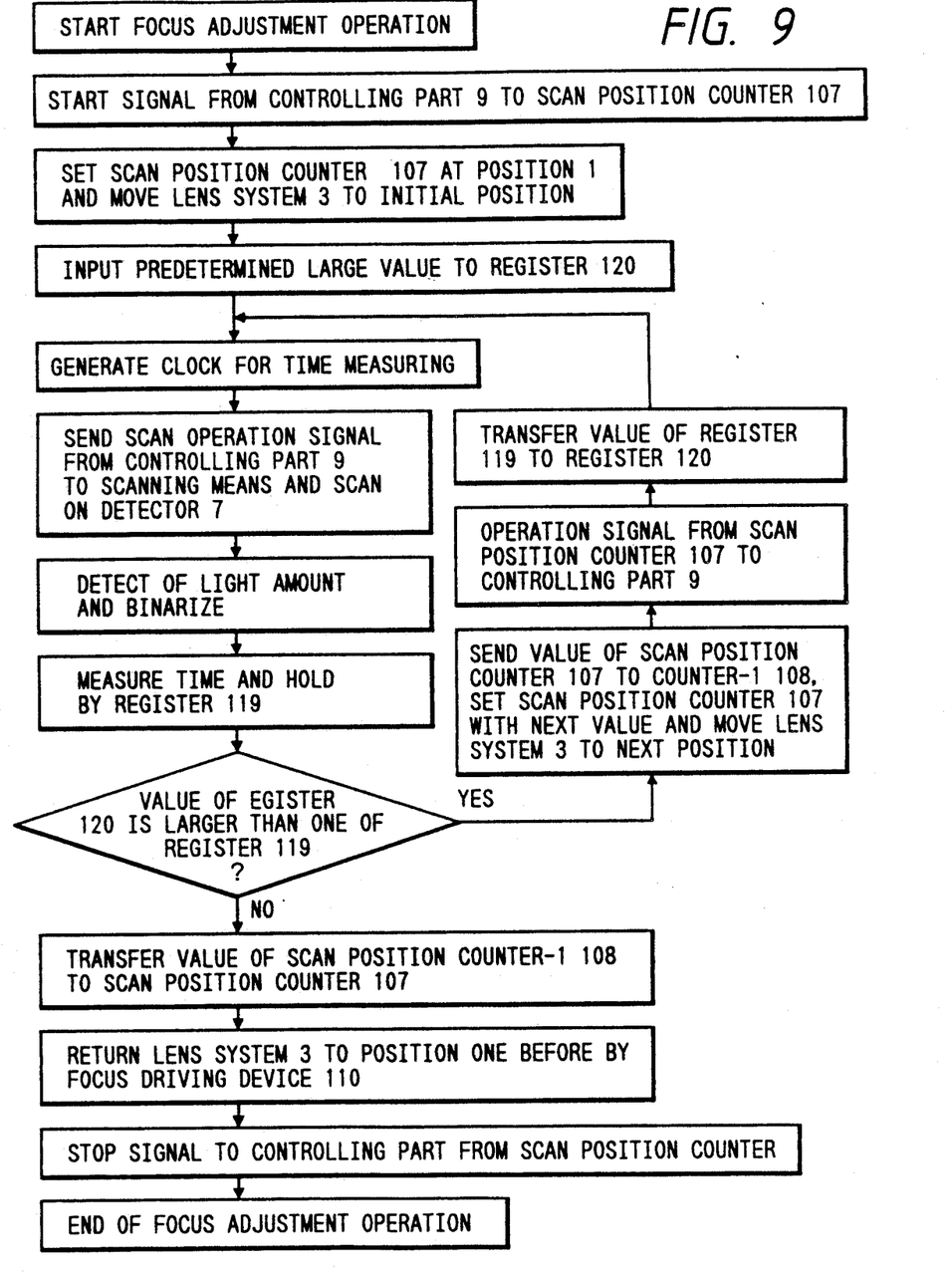
FIG. 9 is a flow chart of the method of FIG. 8.

The quantity of light passed through the spot detector 7 in FIG. 1 differs in the distribution in the scan direction depending on the position in the direction of the optical axis and therefore, the time for which said quantity of light is at a predetermined level or higher. This time becomes minimum at the focus position and therefore, it can be found out. FIG. 8A is a concept diagram of it, and FIG. 8B is a block diagram. FIG. 9 is a flow chart.

Prior to recording an information signal, adjustment of the focus position is effected. The signal of the controlling part 9 is sent to the scan position counter 107. The operations of the scan position counter 107, the driving device 110 for focusing, the scan position counter-1 108 and the photoelectric conversion 101 are similar to those previously described and therefore need not be described.

The output of the photoelectric conversion 101 is an electrical output proportional to the quantity of light passed through the slit, and the time vs. electrical output thereof varies correspondingly to a change in the position in the direction of the optical axis.

The output of the photoelectric conversion 101 is binarized by a binarizing circuit 116. The output wave form thereof is shown in the middle stage of FIG. 8A. A time measuring circuit 117 measures time with a clock 118 for time measuring as the measurement unit. The clock for time measuring may be arbitrary, but may desirably be thirty or more times the scan repetition frequency.

The output of the time measuring circuit 117 is memorized by a register 119 for the latest time. By the starting of the next scan, the value held by the register 119 for the latest time is transferred to a register 120 for the time one before. Prior to measurement, a value much greater than the value coming out during measurement is input to the register 120 for the time one before.

The output of the register 119 for the latest time and the output of the register 120 for the time one before are discriminated by the magnitude discrimination circuit 106 as to whether their magnitudes, i.e., the time of a predetermined level or higher, is increased or decreased. If the polarity of the output of the magnitude discrimination circuit 106 has changed, it is seen that it has passed the position in the direction of the optical axis at which the time of a predetermined level or higher becomes minimum.

The position information one before the current position is input to the scan position counter-1 108 and therefore, if the polarity of the output of the magnitude discrimination circuit 106 has changed, that position in the direction of the optical axis is memorized. This position is the focus position. The operation thereafter is similar to that of the previously described example.

In the examples shown above, the collimator lens system is moved as the means for moving the converged position of the light beam on the scanning surface, but other known techniques may also be used as the means for moving the converged position of the light beam.

The means for moving the converged position of the light beam may conceivably be of the type as shown in Japanese Laid-Open Patent application No. 60-100113 wherein a convex lens disposed between a collimator lens and a rotational polygonal mirror is moved, the type as shown in Japanese Laid-Open Patent application No. 59-116603 wherein a laser source or an imaging lens is moved, the type as shown in Japanese Laid-Open Patent application No. 61-112020 wherein the optical distance between a scanning lens and a scanning medium is variable, or the type as shown in Japanese Laid-Open Patent application No. 61-275868 wherein the power of a laser is variable.

As described above, the present invention can provide, in a scanning optical apparatus provided with a detecting mechanism for scanning a light beam from a light source on a scan surface through a deflector and a lens system and detecting the converged state of the light beam on the scan surface and a focus position moving mechanism for moving the converged position of the light beam on the scan surface, a method wherein a detector for receiving the light beam deflected by the deflector is used as the detecting mechanism for detecting the converged state of the light beam on the scan surface and the light beam from the light source is scanned on the detector a plurality of times through the deflector and the lens system while the converged position of the light beam is moved by the focus position moving mechanism for moving the converged position of the light beam on the scan surface, and the signal from the detector during each scanning is compared or calculation-processed to thereby adjust and determine the converged position of the light beam on the scan surface, thereby readily detecting and correcting any focus deviation by a simple construction.

We claim:

1. A scanning optical apparatus comprising:
   a light source unit;
   optical means for converging a light beam from said light source unit at a predetermined position;
   moving means for moving the converged position of the light beam by said optical means;
   deflecting means for deflecting the light beam from said light source unit in a predetermined direction;
   light receiving means for receiving the light beam deflected by said deflecting means;
   processing means for processing a signal obtained by said light receiving means; and
   control means for controlling said moving means correspondingly to a signal from said processing means;
   wherein the light beam emitted from said light source unit is scanned on said light receiving means a plurality of times through said optical means and said deflecting means while the converged position of the light beam is moved by said moving means, and the signal from said light receiving means during each of said plurality of times of scanning is compared or calculated by said processing means to thereby adjust and determine the converged position of the light beam by said optical means.

2. A scanning optical apparatus according to claim 1, wherein the light beam emitted from said light source unit is not modulated when it is scanned on said light receiving means.

3. A scanning optical apparatus according to claim 1, wherein said light receiving means has an opening.

4. A scanning optical apparatus comprising:
   a light source unit;
   deflecting means for deflecting a light beam from said light source unit in a predetermined direction;
   lens means disposed between said light source unit and said deflecting means;
   moving means for moving a part of said lens means;
   light receiving means for receiving the light beam deflected by said deflecting means;
   processing means for processing a signal obtained by said light receiving means; and
   control means for controlling said moving means correspondingly to a signal from said processing means;
   wherein the light beam emitted from said light source unit is scanned on said light receiving means a plurality of times through said lens means and said deflecting means while a part of said lens means is moved by said moving means, and the signal from said light receiving means during each of said plurality of times of scanning is compared or calculated by said processing means to thereby adjust and determine the position of said part of said lens means.

5. A scanning optical apparatus according to claim 4, wherein the light beam emitted from said light source unit is not modulated when it is scanned on said light receiving means.

6. A scanning optical apparatus according to claim 4, wherein said light receiving means has an opening.

7. A scanning optical apparatus comprising:
   a light source unit;
   optical means for converging a light beam from said light source unit at a predetermined position;
   moving means for moving a part of said optical means;
   deflecting means for deflecting the light beam from said light source unit in a predetermined direction;

light receiving means for receiving the light beam deflected by said deflecting means;

processing means for processing a signal obtained by said light receiving means; and control means for controlling said moving means correspondingly to a signal from said processing means;

wherein the light beam emitted from said light source unit is scanned on said light receiving means a plurality of times through said optical means and said deflecting means while said part of said optical means is moved by said moving means, and the signal from said light receiving means during each of said plurality of times of scanning is compared or calculated by said processing means to thereby adjust and determine the position of a part of said optical means.

8. A scanning optical apparatus according to claim 7, wherein the light beam emitted from said light source unit is not modulated when it is scanned on said light receiving means.

9. A scanning optical apparatus according to claim 7, wherein said light receiving means has an opening.

10. A scanning method in a scanning optical apparatus comprising:

the step of scanning a light beam emitted from a light source unit on light receiving means a plurality of times through optical means for converging the light beam emitted from said light source unit and deflecting means while moving the converged position of the light beam emitted from said light source by said optical means;

the step of comparing or calculating a signal from said light receiving means during each of said plurality of times of scanning to thereby adjust the converged position of the light beam by said optical means; and the step of comparing or calculating the signal from said light receiving means during each of said plurality of times of scanning to thereby determine the converged position of the light beam by said optical means.

11. A scanning method according to claim 10, wherein the light beam emitted from said light source unit is not modulated when it is scanned on said light receiving means.

12. A scanning method according to claim 10, wherein said light receiving means has an opening.

13. A scanning method in a scanning optical apparatus comprising:

the step of scanning a light beam emitted from a light source unit on light receiving means a plurality of times through optical means for converging the light beam emitted from said light source unit and deflecting means while moving a part of said optical means;

the step of comparing or calculating a signal from said light receiving means during each of said plurality of times of scanning to thereby adjust the position of said part of said optical means; and the step of comparing or calculating the signal from said light receiving means during each of said plurality of times of scanning to thereby determine the position of said part of said optical means.

14. A scanning method according to claim 13, wherein the light beam emitted from said light source unit is not modulated when it is scanned on said light receiving means.

15. A scanning method according to claim 13, wherein said light receiving means has an opening.

16. A scanning method in a scanning optical apparatus comprising:

the step of moving a part of optical means for converging a light beam emitted from a light source unit to an initial position;

the step of scanning the light beam emitted from said light source unit on light receiving means a plurality of times through said optical means and deflecting means while moving said part of said optical means in the direction of the optical axis of said optical means; and the step of processing a signal from said light receiving means to thereby adjust and determine the position of said part of said optical means.

17. A scanning method according to claim 16, wherein the light beam emitted from said light source unit is not modulated when it is scanned on said light receiving means.

18. A scanning method according to claim 16, wherein said light receiving mean has an opening.

19. A scanning optical apparatus comprising:

a light source unit;

optical means for converging a light beam from said light source unit at a predetermined position;

varying means for varying the converged position of the light beam by said optical means in the direction of the optical axis of said optical means;

deflecting means for deflecting the light beam from said light source unit in a predetermined direction;

light receiving means for receiving the light beam deflected by said deflecting means;

processing means for processing a signal obtained by said light receiving means; and control means for controlling said varying means correspondingly to a signal from said processing means;

wherein the light beam emitted from said light source unit is scanned on said light receiving means a plurality of times through said optical means and said deflecting means while the converged position of the light beam is varied by said varying means, and the signal from said light receiving means during each of said plurality of times of scanning is compared or calculated by said processing means to thereby adjust and determine the converged position of the light beam by said optical means.

20. A scanning optical apparatus comprising:

a light source unit;

optical means for converging a light beam from said light source unit at a predetermined position;

varying means for varying the converged position of the light beam by said optical means in the direction of the optical axis of said optical means;

deflecting means for deflecting the light beam from said light source unit in a predetermined direction;

light receiving means for receiving the light beam deflected by said deflecting means;

processing means for processing a signal obtained by said light receiving means; and control means for controlling said varying means correspondingly to a signal from said processing means;

wherein the light beam emitted from said light source unit is scanned on said light receiving means a plurality of times through said optical means and said deflecting means while the converged position of the light beam is varied by said varying means, and the signal from said light receiving means during each of said plurality of times of scanning is calculated by said processing means to thereby determine the converged position of the light beam by said optical means on the basis of the calculation result.

21. A scanning optical apparatus comprising:

a light source unit;

lens system for converging a light beam from said light source unit at a predetermined position;

varying means for varying the converged position of the light beam by said lens system in the direction of the optical axis of said lens system;

deflector for deflecting the light beam from said light source unit in a predetermined direction;

light receptor for receiving the light beam deflected by said deflector;

processor for processing a signal obtained by said light receptor; and control means for controlling said varying means correspondingly to a signal from said processor;

wherein the light beam emitted from said light source unit is scanned on said light receptor a plurality of times through said lens system and said deflector while the converged position of the light beam is varied by said varying means, and the signal from said light receptor during each of said plurality of times of scanning is compared or calculated by said processor to thereby adjust and determine the converged position of the light beam by said lens system.

22. A method for determining a converged position of a light beam in a scanning optical apparatus comprising:

the step of scanning a light beam emitted from a light source unit on light receiving means a plurality of times through optical means for converging the light beam emitted from said light source unit and deflecting means while moving the converged position of the light beam emitted from said light source unit by said optical means; and the step of comparing or calculating the signal from said light receiving means during each of said plurality of times of scanning by processing means to thereby determine the converged position of the light beam by said optical means.

23. A method for determining a converged position of a light beam in a scanning optical apparatus comprising:

the step of scanning a light beam emitted from a light source unit on light receiving means a plurality of times through optical means for converging the light beam emitted from said light source unit and deflecting means while moving the converged position of the light beam emitted from said light source unit by said optical means; and the step of repeatedly comparing the signal from said light receiving means during each of said plurality of times of scanning to thereby determine the converged position of the light beam by said optical means.

24. A method for determining a converged position of a light beam in a scanning optical apparatus comprising:

the step of a first scanning a light beam emitted from a light source unit on light receiving means through optical means for converging the light beam emitted from said light source unit and deflecting means while moving the converged position of the light beam emitted from said light source unit by said optical means to a first position;

the step of a second scanning a light beam emitted from a light source unit on light receiving means through optical means for converging the light beam emitted from said light source unit and deflecting means while moving the converged position of the light beam emitted from said light source unit by said optical means to a second position different from the first position;

the step of calculating signals from said light receiving means during the first scanning and the second scanning;

the step of moving the converged position of the light beam emitted from said light source unit by said optical means to a third position different from the first position and the second position on the basis of the calculation result of the signals from said light receiving means during the first scanning and the second scanning;

the step of a third scanning a light beam emitted from said light source unit on light receiving means through said optical means and deflecting means;

the step of calculating signals from said light receiving means during the second scanning and the third scanning; and the step of moving the converged position of the light beam emitted from said light source unit by said optical means to the second position on the basis of the calculation result of the signals from said light receiving means during the second scanning and the third scanning.

25. A method for determining a converged position of a light beam in a scanning optical apparatus comprising:

the step of a first scanning a light beam emitted from a light source unit on light receiving means through optical means and deflecting means;

the step of a second scanning a light beam emitted from said light source unit on light receiving means through said optical means and said deflecting means while moving the converged position of the light beam emitted from said light source unit by said optical means to a position different from a converged position of the light beam at the first scanning;

the step of calculating signals from said light receiving means during the first scanning and the second scanning;

the step of moving the converged position of the light beam emitted from said light source unit by said optical means to a position different from a converged position of the light beam at the second scanning on the basis of the calculation result of the signals from said light receiving means during the first scanning and the second scanning;

the step of a third scanning light beam emitted from said light source unit on light receiving means through said optical means and said deflecting means;

the step of calculating signals from said light receiving means during the second scanning and the third scanning; and the step of moving the converged position of the light beam emitted from said light source unit by said optical means to the position at the second scanning on the basis of the calculation result of the signals from said light receiving means during the second scanning and the third scanning.

26. A method for determining a converged position of a light beam in a scanning optical apparatus comprising:

the step of scanning a light beam emitted from a light source unit on light receiving means a plurality of times through optical means for converging the light beam emitted from said light source unit and deflecting means while moving the converged position of the light beam emitted from said light source unit by said optical means;

the step of comparing or calculating a signal from said light receiving means during each of said plurality of times of scanning by processing means to thereby detect an extreme value of desired information content; and the step of stopping movement of the converged position of the light beam emitted from said light source unit by said optical means when the extreme value of said information content is detected.

* * * * *